United States Patent [19]
Tanaka et al.

[11] Patent Number: 5,600,492
[45] Date of Patent: Feb. 4, 1997

[54] SURFACE-CURVED OPTICAL ELEMENT ADAPTED FOR EMERGENCE AND INCIDENCE OF PARALLEL LIGHT RAYS

[75] Inventors: Hirokazu Tanaka, Tokyo-to; Fumio Ogawa, Kanagawa-ken, both of Japan

[73] Assignee: Stanley Electric Corporation, Tokyo-to, Japan

[21] Appl. No.: 418,974

[22] Filed: Apr. 7, 1995

[30] Foreign Application Priority Data

May 2, 1994 [JP] Japan ................................. 6-113421

[51] Int. Cl.$^6$ .............................. G02B 3/02; G02B 13/18
[52] U.S. Cl. .......................... 359/712; 359/708; 359/718
[58] Field of Search ................................. 359/708, 710, 359/712, 718, 719

[56] References Cited

U.S. PATENT DOCUMENTS 4,655,555  4/1987  Machler et al. ................. 359/712
5,285,318  2/1994  Gleckman ........................ 359/709
5,343,325  8/1994  Yamakawa ...................... 359/710

*Primary Examiner*—Georgia Y. Epps
*Assistant Examiner*—Evelyn A. Lester
*Attorney, Agent, or Firm*—Loeb & Loeb LLP

[57] ABSTRACT

The invention relates to an optical element being conveniently useful, for example as an external cover of transmitter and/or receiver for optical communication and more particularly to a surface-curved optical element comprising a transparent body of a refractive index n having a pair of boundary surfaces defined in their cross-section by the corresponding pair of ellipsoidal curves of an eccentricity 1/n. The boundary surfaces of this surface-curved optical element are configured so that they should have their focal points aligned with one another on a straight line and their focal points which are remote from vertices of the respective ellipsoidal surfaces corresponding to the apsides of the respective ellipsoidal curves should be coincident with each other, whereby parallel light rays entering the surface-curved optical element should emerge from this in the form of the parallel light rays without any disturbance.

4 Claims, 6 Drawing Sheets

SURFACE-CURVED OPTICAL ELEMENT ADAPTED FOR EMERGENCE AND INCIDENCE OF PARALLEL LIGHT RAYS

BACKGROUND OF THE INVENTION

1. Technical Field

The present invention relates to a surface-curved optical element used in transmitter and receiver for optical communication.

2. Prior Art

An optical transmitter incorporating the optical element of well known type will be discussed in reference with FIG. 8 of the accompanying drawings, in which reference numeral 1 designates a paraboloidal concave mirror and a light emitting source 2 is located at a focal point Fa of this paraboloidal mirror 1.

Reference numeral 3 designates the optical element in the form of a transparent cover having two boundary surfaces comprising spherical surfaces of which the spherical surface 3a defining the inner boundary surface and the spherical surface 3b defining the outer boundary surface are configured so as to be mutually in concentric relationship at a point A.

In other words, the transparent cover 3 is formed by a transparent synthetic resin plate of a uniform thickness. Said light emitting source 2 is located on an imaginary straight line Z corresponding to an optical axis of this transparent cover 3.

A light ray L24 emitted from the light emitting source 2 is reflected by the paraboloidal mirror 1 so as to be directed along the optical axis Z toward the transparent cover 3 in the form of a light ray L25 and enters the inner spherical surface 3a of the transparent cover 3.

The light ray L25 having entered the spherical surface 3a at a point P1 is now refracted so as to be oriented along extension of a straight line connecting a focal point Fb and said point P1 of the spherical surface 3a in the form of a light ray L26 and this refracted light ray L26 then enters the outer spherical surface 3b of the transparent cover 3.

The light ray L26 is refracted again at a point P2 on the spherical surface 3b and exits the transparent cover 3 now in the form of a light ray L27.

With the optical transmitter as has been described above, an optical attenuation is enhanced as a function of a distance over which the optical communication is desired, since the light ray L27 exiting the transparent cover 3 becomes divergent. Accordingly, such optical transmitter can not reliably function in the optical communication over a relatively long distance.

More specifically, an angle θ1 at the point P1 must be equal to an angle θ2 at the point P2 in order to assure that the light ray L27 should be in parallel to the optical axis Z and, to meet this requirement, a normal line N1 to the point P1 must be in parallel to a normal line N2 to the point P2.

However, these two normal lines N1, N2 are straight lines passing the common centre A and therefore they become non-parallel straight lines intersecting each other at an angle of θ3 as indicated in FIG. 8 rather than extending in parallel to each other.

In a consequence, θ1≠θ2 and the light ray L27 becomes divergent.

While it may be possible to direct the light ray L27 emerging from the transparent cover 3 in parallel to the optical axis Z when said transparent cover 3 is formed by plano glass, use of such plano glass will inevitably standardize the external appearance of the transparent cover 3 and restricts a freedom of designing.

SUMMARY OF THE INVENTION

In view of the above-mentioned situation of art, it is a principal object of the invention to provide an optical element of such type having a surface-curved apprearance and assuring it to achieve a reliable optical transmission using the parallel light rays.

The object set forth above is achieved, according to first aspect of the invention, by a surface-curved optical element formed by a transparent body of a refractive index n having two boundary surfaces defined in their cross-sections by two similar ellipsoidal curves of an eccentricity 1/n and adapted for emergence and entrance of parallel light rays, characterized by a configuration such that these two ellipsoidal curves defining said boundary surfaces, respectively, have their focal points aligned with one another on a straight line and, of these focal points, the focal points being remote from vertices of the respective ellipsoidal surfaces corresponding to the apsides of the respective ellipsoidal curves are coincident with each other.

With the surface-curved optical element according to this first aspect of the invention, when a parallel light ray enters a first boundary surface of two boundary surfaces defined in their cross-sections by ellipsoidal curves, said parallel light ray is refracted at this entrance point so as to be directed along extension of a straight line connecting a focal point being remote from a vertex of this boundary surface, i.e., an apsis of the corresponding ellipsoidal curve before entering a second boundary surface.

The second boundary surface is configured similarly to the first boundary surface so as to be defined in its cross-section by an ellipsoidal curve of an eccentricity 1/n where n represents a refractive index of this optical element. In addition, this ellipsoidal curve is configured so that its focal point being remote from a vertex of the second boundary surface, i.e., an apsis of the corresponding ellipsoidal curve should be coincident with the corresponding focal point of the ellipsoidal curve defining the first boundary surface. Therefore, the normal line to the incidence point on the first boundary surface is parallel to the normal line to the exit point on the second boundary surface.

Accordingly, the light ray refracted at the first boundary surface corresponds to the light ray coming from the focal point of the ellipsoidal curve defining the second boundary surface and the light ray having entered this second boundary surface emerges therefrom in the form of a light ray being parallel to the optical axis.

The object set forth above is achieved, according to second aspect of the invention, by a surface-curved optical element formed by a transparent body of a refractive index having a pair of boundary surfaces defined in their cross-sections by the corresponding pair of similar ellipsoidal curves of an eccentricity 1/n, characterized in that said optical element comprises a plane-parallel transparent body and an additional portion provided so as be integrally contiguous to at least one side of said plane-parallel transparent body for emergence and incidence of parallel light rays, wherein said additional portion is so configured that a pair of ellipsoidal curves defining a pair of boundary surfaces, respectively, have their focal points aligned with one another on a straight line and, of these focal points, the focal points being remote from vertices of the respective ellipsoidal surfaces corresponding to the apsides of the respective ellipsoidal curves are coincident with each other.

The surface-curved optical element according to this second aspect of the invention comprises a portion corresponding to the surface-curved optical element according to the first aspect of the invention provided so as to be integrally contiguous to at least one side of a plane-parallel transparent body. With this optical element, a parallel light ray having entered the plane-parallel transparent body emerges therefrom in the form of a light ray is maintained in parallel to the optical axis while a light ray having entered the surface-curved portion is refracted on the second boundary surface so as to be emerged therefrom in the form of a light ray being in parallel to the optical axis just as achieved according to the first aspect of the invention.

The surface-curved optical element of the invention is very effective for optical transmission to a remote station, since the parallel light ray having entered the optical element emerges therefrom also in the form of the parallel light ray.

Another advantage provided by the invention lies in a high freedom of designing the optical transmitter or the like incorporating the inventive optical element because of its surface-curved external appearance.

Furthermore, the optical element of the invention is well resistant to an external pressure and therefore has a high durability, since its entrance and emergence surfaces are concave and convex, respectively.

Finally, the surface-curved optical element according to the second aspect of the invention, which comprises a portion corresponding to the surface-curved optical element according to the first aspect of the invention provided so as to be integrally contiguous to at least one side of a plane-parallel transparent body, achieves the same effect as the optical element according to the first aspect of the invention can achieve, since both the parallel light ray having entered the plane-parallel transparent body and the parallel light ray having entered said surface-curved portion of the optical element emerge therefrom in the form of the parallel light rays having the same orientation.

DESCRIPTION OF THE PREFERRED EMBODIMENTS

A full understanding of the invention can be gained from the following description of the preferred embodiments as applied to transmitter and receiver for optical communication when read in conjunction with the accompanying drawings.

Figure 1:
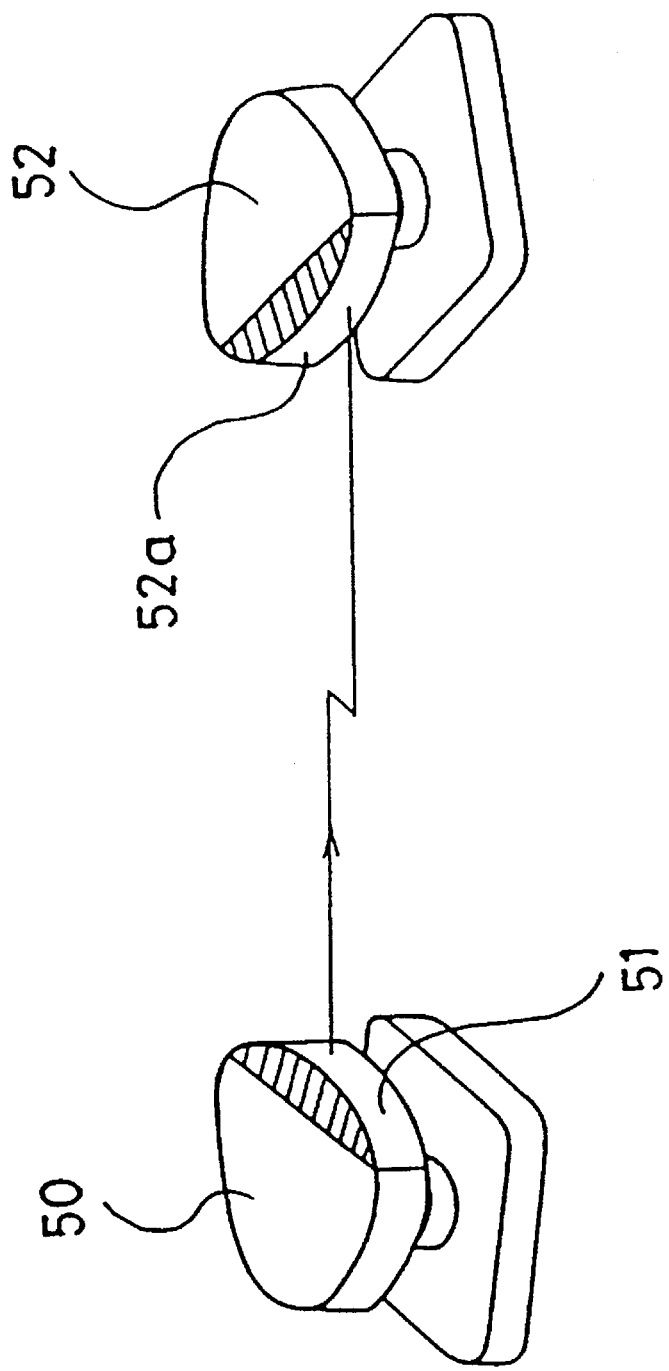
FIG. 1 is a perspective view schematically illustrating a first embodiment of the optical element according to the invention as used in transmitter and receiver for optical communication.
Figure 2:
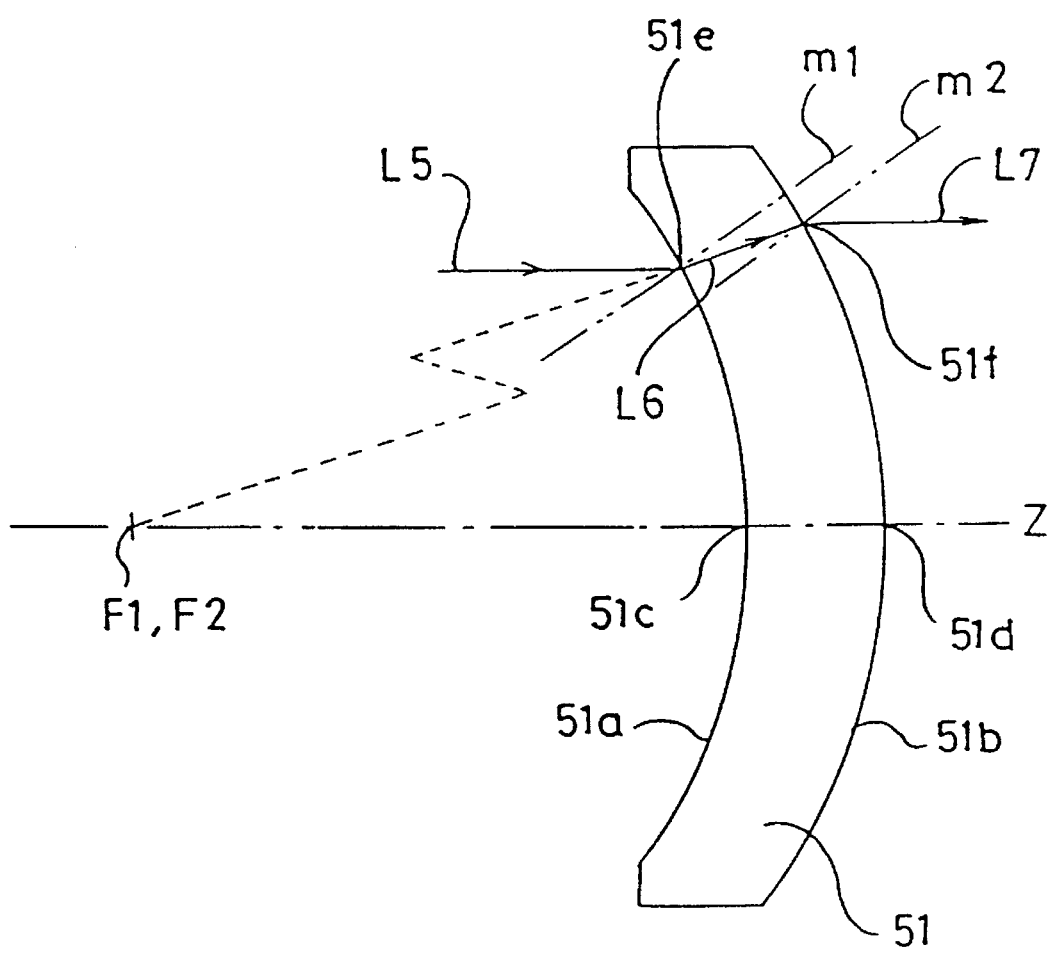
FIG. 2 is an optical diagram illustrating the optical element of the invention embodied as an external cover of the optical transmitter.

FIGS. 1 and 2 illustrate a first embodiment of the invention, of which FIG. 1 is a schematic perspective view exemplarily illustrating the optical element according to the invention used in the transmitter and receiver for optical communication and FIG. 2 is an optical diagram of the inventive optical element used as an external cover of the optical transmitter.

Referring to these figures, the optical transmitter 50 is provided on its front side with the optical element of the invention as the external cover 51 and contains therein a light emitting source 2 as well as a paraboloidal mirror 1 serving to collimate the light rays emitted from the light emitting source 2, both having previously been described in reference with the prior art.

An optical receiver 52 also is provided on its front side with an external cover 52a similar to said external cover 51 and contains therein a paraboloidal mirror serving to collect the light rays transmitted by the optical transmitter 50 as well as receiving optics serving to receive the collected light rays.

Said optical transmitter 50 inclusive of its external cover 51 has its external appearance characterized by a curved surface as will be seen in FIG. 1 and this surface-curved external cover 51 is configured as illustrated by FIG. 2.

The external cover 51 comprises a transparent body having a refractive index N=n made of, for example, synthetic resin and having a pair of boundary surfaces (i.e., ellipsoidal surfaces 51a, 51b) defined in their cross-sections by the corresponding pair of ellipsoidal curves having an eccentricity e=1/n.

These ellipsoidal surfaces 51a, 51b defining the pair of boundary surfaces are configured so that these ellipsoidal surfaces 51a, 51b should have their focal points aligned with one another on a straight line and their focal points F1, F2 which are remote from vertices 51c, 51d of the respective ellipsoidal surfaces corresponding to the apsides of the respective ellipsoidal curves should be coincident with each other.

Figure 3:
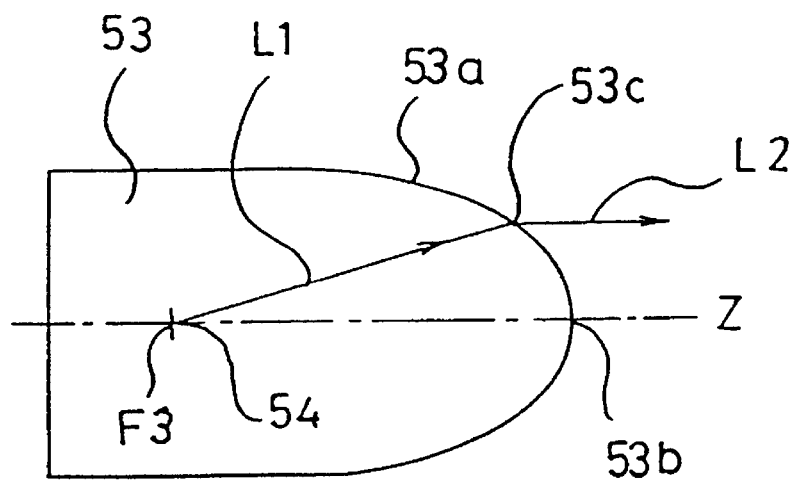
FIG. 3 is an optical diagram illustrating one of boundary surfaces defining said optical element.
Figure 4:
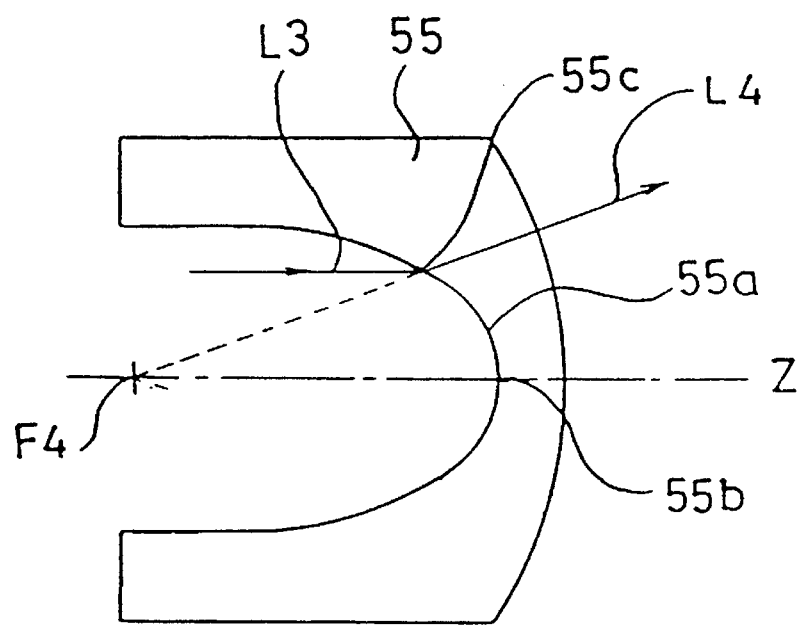
FIG. 4 is an optical diagram illustrating the other boundary surface of said optical element.

Said pair of ellipsoidal surfaces 51a, 51b present the configurations as illustrated by FIGS. 3 and 4, respectively.

Referring to FIG. 3, a transparent body 53 of a refractive index n presents a boudary surface defined by an ellipsoidal surface 53a of an eccentricity e=1/n.

A light emitting source 54 is located on a focal point F3 which is remote from a vertex 53b of the ellipsoidal surface 53a corresponding to an apsis of the ellipsoidal curve defining the cross-section of this ellipsoidal surface 53a.

A light ray L1 emitted from the light emitting source 54 is refracted at an exit point 53c to form a refracted light ray L2 extending in parallel to an optical axis Z as said light ray L1 exits the ellipsoidal surface 53a, since the light emitting source 54 is located at the focal point F3 of the ellipsoidal surface 53a.

Such arrangement is well known for application to the collimator's light emitting source.

Referring to FIG. 4, on the other hand, a transparent body 55 of a refractive index n presents a concave boundary surface defined by an ellipsoidal surface 55a of an eccentricity e=1/n and having a focal point F4 which is remote from a vertex 55b of the ellipsoidal surface 55a corresponding to an apsis of the ellipsoidal curve defining the cross-section of this ellipsoidal surface 55a.

A light ray L3 extending in parallel to the optical axis Z is refracted at an incident point 55c so as to be directed along extension of a straight line connecting the focal point F4 and the incident point 55c in the form of a refracted light ray L4 as said light ray L3 enters the ellipsoidal surface 55a.

Figure 5:
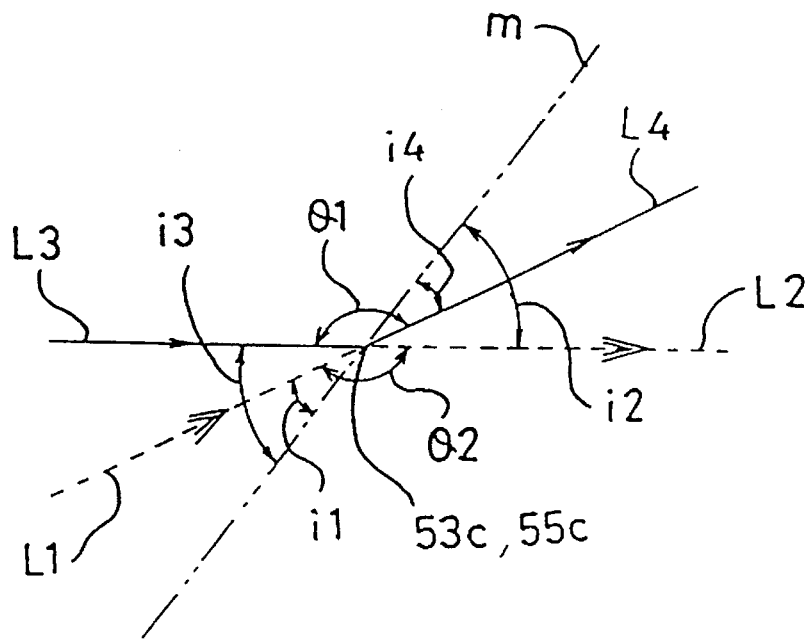
FIG. 5 is a diagram illustrating an operating principle of the optical element.

The light rays L1 and L4 illustrated by FIGS. 3 and 4, respectively, can be oriented in coincidence with each other in the manner as illustrated by FIG. 5.

More specifically, assumed that a reference symbol m designates a normal line to the exit point 53c of the ellipsoidal surface 53a in FIG. 3 as well as a normal line to the incidence point 55c of the ellipsoidal surface 55a in FIG. 4, the light ray L1 will enter the ellipsoidal surface 53a at the exit point 53c with an incidence angle i1 and be refracted at said exit point 53c with a refraction angle i2 to form the refracted light ray L2, on one hand, and the light ray L3 will enter the ellipsoidal surface 55a at the incidence point 55c with an incidence angle i3 and be refracted at said incidence point 55c with a refraction angle i4 to form the refracted light ray L4, on the other hand. In this manner, the incidence angle i1 of the light ray L1 will be equalized to the refraction angle i4 of the refracted light ray L4 and the incidence angle i3 of the light ray L3 will be equalized to the refraction angle i2 of the light ray L2.

Accordingly, the light ray L1 and the refracted light ray L4 will be identically oriented so far as an angle θ1 is equal to an angle θ2 and the light ray L3 has the same orientation as that of the refracted light ray L2, as will be apparent from FIG. 5.

The external cover 51 illustrated by FIG. 2 is configured so that, of the ellipsoidal surfaces 51a, 51b defining the pair of boundary surfaces, the one ellipsoidal surface 51a corresponds to the ellipsoidal surface 55a in FIG. 4 and the other ellipsoidal surface 51b corresponds to the ellipsoidal surface 53a in FIG. 3.

The focal points F1, F2 which are really common to those two ellipsoidal surfaces 51a, 51b correspond to the focal point F4 in FIG. 4 and to the focal point F3 in FIG. 3, respectively.

Referring to FIG. 2, a light ray L5 extending in parallel to the optical axis Z which has entered the ellipsoidal surface 51a of the external cover 51 is then refracted at the incidence point 51e so as to be directed along extension of a straight line connecting the focal point F1 and the incidence point 51e and exits the ellipsoidal surface 51b at the exit point 51f in the form of a refracted light ray L6.

The ellipsoidal surface 51b is defined by the eccentricity e=1/n, so a normal line m2 to the exit point f corresponds to the normal line m in FIG. 5 and therefore the normal lines m1, m2 are parallel to each other.

The focal point F2 of the ellipsoidal surface 51b corresponds to the focal point F3 in FIG. 3 and therefore said refracted light ray L6 corresponds to the light ray L1 in FIG. 3.

Consequently, the light ray L6 is refracted at the exit point 51f of the ellipsoidal surface 51b so as to extend in parallel to the optical axis Z as in the case of the light ray L2 in FIG. 3 and emerges in the form of a parallel light ray L7.

The invention has been described hereinabove as applied to the external cover 51 of the optical transmitter and it will be readily appreciated that the invention can be similarly embodied as the external cover 52a of the optical receiver 52.

Figure 6:
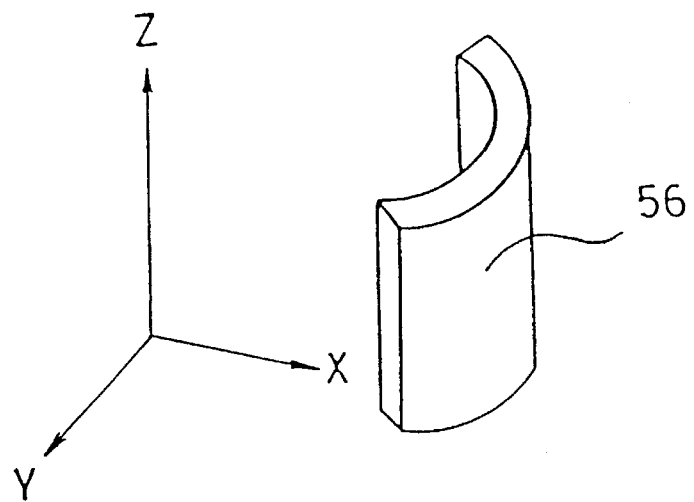
FIG. 6 is a perspective view schematically illustrating a variant of said optical element.

FIG. 6 illustrates an external cover 56, a variant of the previously mentioned external cover 51, which has also a surface curved but vertically long configuration defining exit and incidence surfaces for the parallel light rays. The light ray of Z=C (constant) maintains Z=C even after its emergence and its configuration in XY-plane may be similar to that illustrated by FIG. 2.

Figure 7:
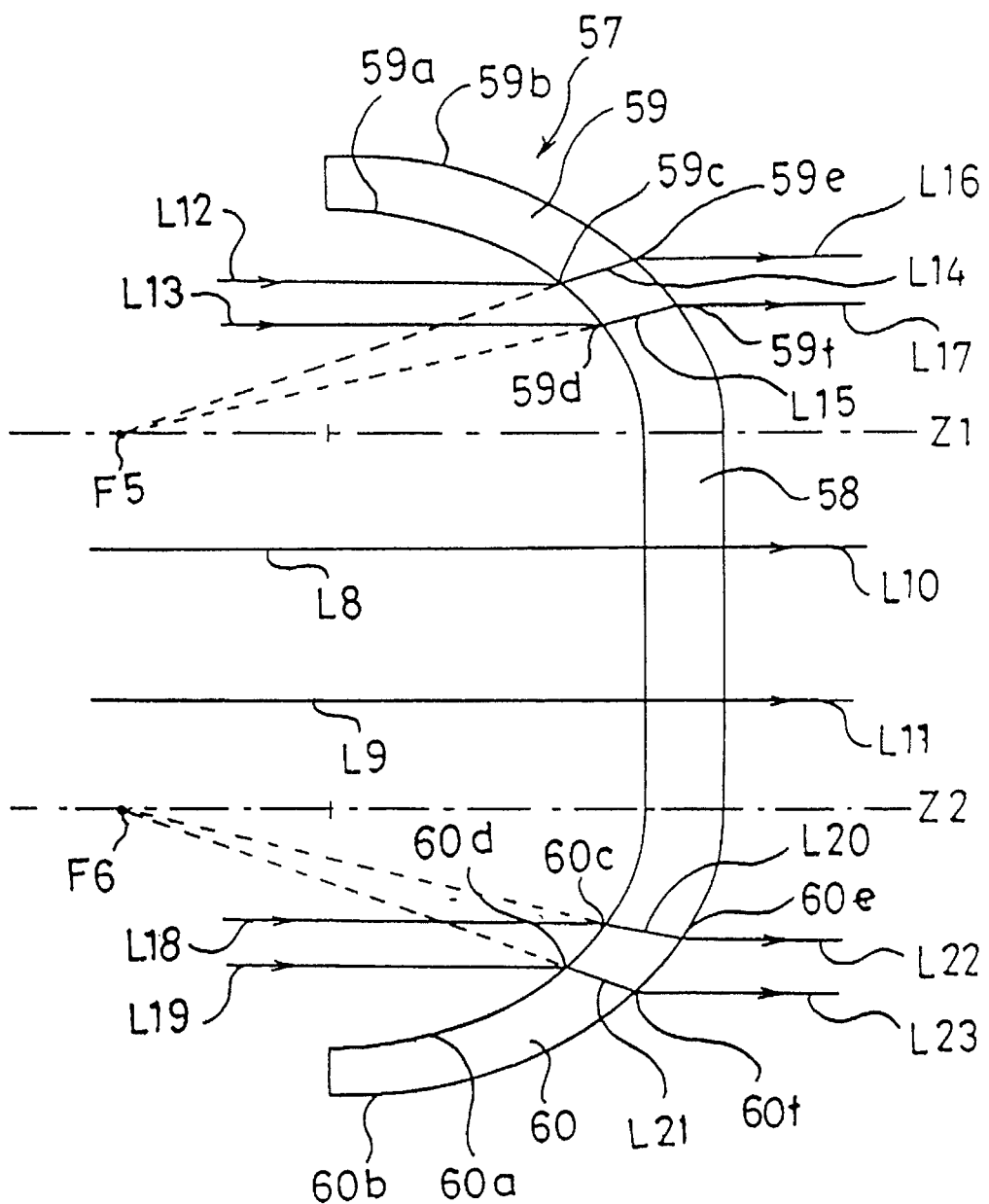
FIG. 7 is an optical diagram illustrating a second embodiment of the optical element according to the invention as embodied as an external cover of the optical transmitter.
Figure 8:
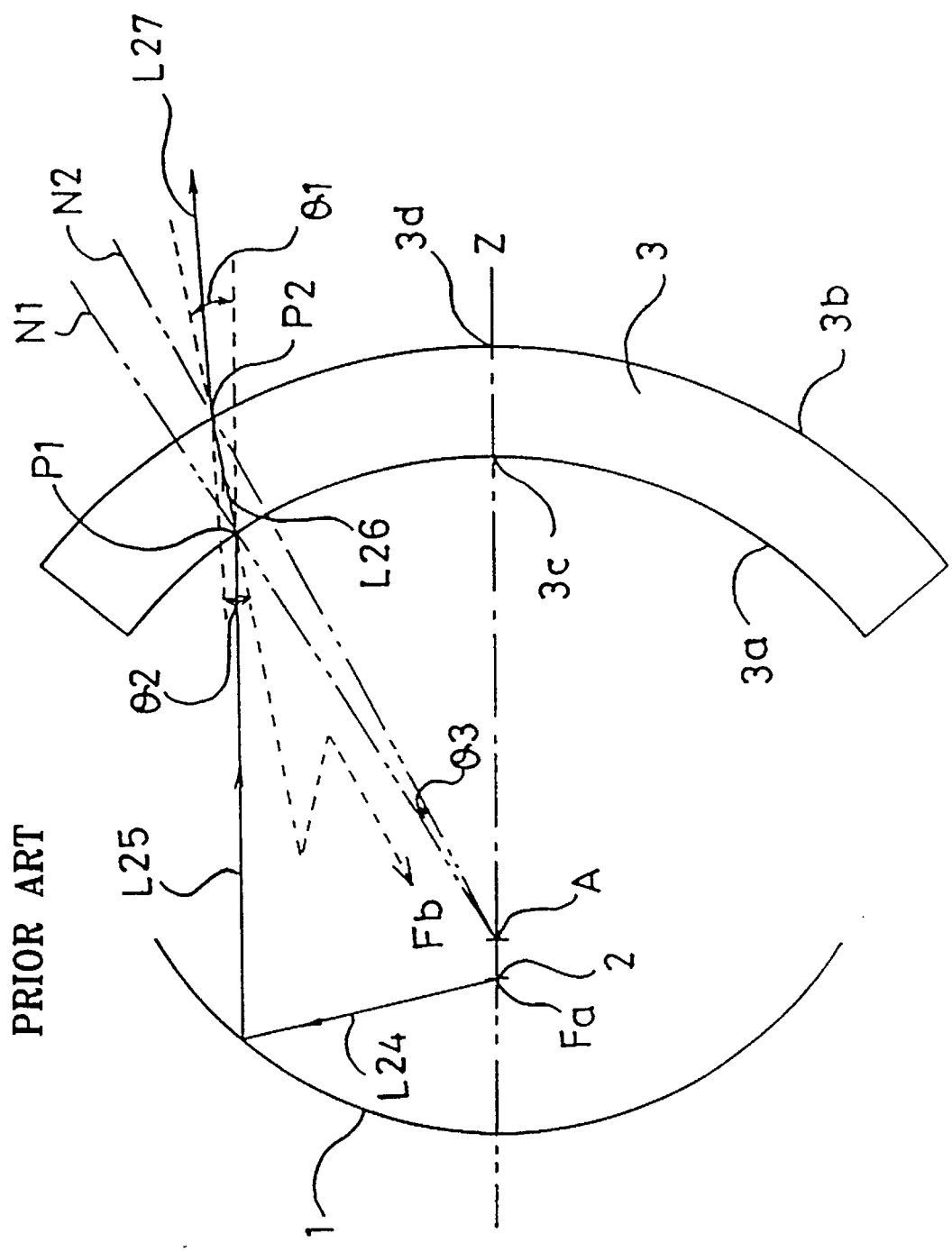
FIG. 8 is an optical diagram illustrating an optical transmitter incorporating the optical element of conventional type.

FIG. 7 is an optical diagram illustrating a second embodiment of the invention as the external cover of the optical transmitter.

This external cover 57 illustrated by FIG. 7 has its central section defined by a plane-parallel transparent body 58 provided on both sides with transparent bodies 59, 60 each having the configuration similar to the external cover 51 illustrated by FIG. 2 and being integral with said central plane-parallel transparent body 58.

Parallel light rays L8, L9 having entered the central section of the external cover 57 go straight through the plane-parallel transparent body 58 and are transmitted from the external cover 57 in the form of light rays L10, L11 maintained in collimated relationship.

Of the parallel light rays having entered the opposite side sections of the external cover 57, parallel light rays L12, L13 having entered the transparent body 59 are refracted at respective incidence points 59c, 59d on the ellipsoidal surface 59a so as to be directed along extensions of straight lines connecting a common focal point F5 of two ellipsoidal surfaces 59a, 59b to respective incidenc points 59c, 59d and emerge from the ellipsoidal surface 59b at exit points 59e, 59f in the form of refracted light rays L14, L15, respectively.

The refracted light rays L14, L15 are refracted again at the exit points 59e, 59f on the ellipsoidal surface 59b so as to extend in parallel to the optical axis Z1 of the transparent body 59 and are optically transmitted in the form of parallel light rays L16, L17, respectively.

Parallel light rays L18, L19 having entered the transparent body 60 are refracted at respective incidence points 60c, 60d on the ellipsoidal surface 60a so as to be directed along extensions of straight lines connecting a common focal point F6 of two ellipsoidal surfaces 60a, 60b to the respective incidence points 60c, 60d and emerge from exit points 60e, 60f on the ellipsoidal surface 60b in the form of refracted light rays L20, L21, respectively.

The refracted light rays L20, L21 are refracted again at the exit points 60e, 60f on the ellipsoidal surface 60b in the same manner as has been described above so as to extend in parallel to an optical axis Z2 of the transparent body 60 and are optically transmitted in the form of parallel light rays L22, L23, respectively.

While the invention has been described hereinabove with respect to several specific embodiments, the surface-curved optical element of the invention may be formed from transparent material such as synthetic resin or glass and, in the case of the second embodiment, one of the surface-curved transparent body integrally provided on both sides of the plane-parallel central transparent body 58 may be eliminated.

What is claimed is:

1. An optical element comprising:

a transparent body having a refractive index n and having first and second boundary surfaces defining, in cross-section, first and second ellipsoidal curves having an eccentricity of 1/n and adapted for entrance and emergence of parallel light rays, the first ellipsoidal curve defining a first focal point and a first apsis, the first ellipsoidal surface having a first vertex corresponding to the first apsis, the second ellipsoidal curve defining a second focal point and a second apsis, the second ellipsoidal surface having a second vertex corresponding to the second apsis, the first and second focal points being coincident, aligned on a straight line, and remote from the first and second vertices.

2. An optical element comprising:

a transparent body having a refractive index n, the transparent body comprising:

a central portion comprising a plane-parallel transparent body, and at least one additional portion having first and second boundary surfaces defining in cross-section, first and second ellipsoidal curves having an eccentricity of 1/n and adapted for entrance and emergence of parallel light rays, the first ellipsoidal curve defining a first focal point and a first apsis, the first ellipsoidal surface having a first vertex corresponding to the first apsis, the second ellipsoidal curve defining a second focal point and a second apsis, the second ellipsoidal surface having a second vertex corresponding to the second apsis, the first and second focal points being coincident, aligned on a straight line, and remote from the first and second vertices.

3. The optical element of claim 1 or 2, wherein the transparent body comprises at least one of synthetic resin and glass.

4. The optical element of claim 1 or 2, wherein the transparent body is configured as an external cover for at least one of an optical communication transmitter and an optical communication receiver.

* * * * *